US010242604B2

(12) United States Patent
Li et al.

(10) Patent No.: US 10,242,604 B2
(45) Date of Patent: Mar. 26, 2019

(54) DISPLAY DEVICE

(71) Applicant: BOE TECHNOLOGY GROUP CO., LTD., Beijing (CN)

(72) Inventors: Yanzhao Li, Beijing (CN); Changcheng Ju, Beijing (CN); Yuedi He, Beijing (CN); Feng Jiang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 45 days.

(21) Appl. No.: 15/501,423

(22) PCT Filed: May 18, 2016

(86) PCT No.: PCT/CN2016/082499
§ 371 (c)(1),
(2) Date: Feb. 2, 2017

(87) PCT Pub. No.: WO2017/133134
PCT Pub. Date: Aug. 10, 2017

(65) Prior Publication Data
US 2018/0053450 A1 Feb. 22, 2018

(30) Foreign Application Priority Data
Feb. 3, 2016 (CN) .......................... 2016 1 0077750

(51) Int. Cl.
*G09F 9/30* (2006.01)
*G02F 1/01* (2006.01)
(Continued)

(52) U.S. Cl.
CPC .............. *G09F 9/30* (2013.01); *G02F 1/0102* (2013.01); *G02F 1/0121* (2013.01);
(Continued)

(58) Field of Classification Search
CPC . G09F 9/30; G09F 9/3026; G02F 1/01; G02F 1/0102; G02F 1/0121;
(Continued)

(56) References Cited

U.S. PATENT DOCUMENTS 7,262,758 B2 * 8/2007 Kahen ............... G02F 1/133617
345/102
9,076,976 B2 * 7/2015 Seo ..................... H01L 51/5016
(Continued)

FOREIGN PATENT DOCUMENTS

| CN | 101079212 A | 11/2007 |
|---|---|---|
| CN | 104849911 A | 8/2015 |

(Continued)

OTHER PUBLICATIONS

International Search Report and Written Opinion in PCT/CN2016/082499 dated Sep. 28, 2016, with English translation. 14 pages.
(Continued)

*Primary Examiner* — Loha Ben
(74) *Attorney, Agent, or Firm* — Womble Bond Dickinson (US) LLP

(57) ABSTRACT

Embodiments of the invention disclose a display device, comprising a substrate, a plurality of pixels on the substrate and a backlight module located at a side of the substrate away from the pixels. Each pixel has a microcavity structure, in which the light emitted from the backlight module oscillates many times and exits as visible light of at least three colors, thereby enabling the display device to realize color display. Compared to the existing liquid crystal display device, this display device will not be limited by the manufacturing process when it is applied in the flexible display field. Compared to the existing organic electroluminescent display device, this display device will not have the problems of low yield, high cost and short life time, etc.

20 Claims, 2 Drawing Sheets

(51) Int. Cl.
*G02F 1/23* (2006.01)
*G09G 3/36* (2006.01)

(52) U.S. Cl.
CPC .............. *G02F 1/0147* (2013.01); *G02F 1/23* (2013.01); *G02F 1/01* (2013.01); *G02F 2201/17* (2013.01); *G02F 2203/34* (2013.01); *G09G 3/3648* (2013.01); *G09G 3/3685* (2013.01); *G09G 3/3688* (2013.01)

(58) Field of Classification Search
CPC ......... G02F 1/133377; G02F 1/133617; G02F 1/133621; G02F 1/0147; G02F 1/23; G02F 2201/17; G02F 2203/34; G09G 3/3644; G09G 3/3648; G09G 3/3685; G09G 3/3688; G09G 3/3696; H01L 51/0058; H01L 51/0085; H01L 2251/552; C09K 11/06
USPC ............... 359/237, 245, 254, 259, 261, 279; 345/46, 48, 55, 59, 102; 372/39, 96, 97
See application file for complete search history.

(56) References Cited

U.S. PATENT DOCUMENTS

| | | | |
|---|---|---|---|
| 9,341,908 B2 * | 5/2016 | Kimura | G02F 1/13624 |
| 9,525,140 B2 * | 12/2016 | Yokoyama | C07D 471/04 |
| 9,663,711 B2 * | 5/2017 | Takeda | H01L 51/0058 |
| 9,876,056 B2 * | 1/2018 | Seo | H01L 27/3213 |
| 2002/0015219 A1 | 2/2002 | Islam | |
| 2012/0319569 A1 | 12/2012 | Okamoto et al. | |
| 2016/0356455 A1 | 12/2016 | Li | |
| 2017/0117330 A1 | 4/2017 | Jiang et al. | |
| 2017/0253796 A1 * | 9/2017 | Takeda | H01L 51/0058 |

FOREIGN PATENT DOCUMENTS

| | | |
|---|---|---|
| CN | 105280686 A | 1/2016 |
| JP | 2001210471 A | 8/2001 |

OTHER PUBLICATIONS

Wang et al., "Photo-luminescent Screens for Optically Written Displays based on Upconversion of Near Infrared Light", Electronics Letters, vol. 40, No. 16, Aug. 5, 2004, 2 pages.

Tao et al., "Fabry-Perot Microcavity Luminescent Screens for Optically Written Display", Optical Engineering, vol. 46, No. 7, Jul. 2007, pp. 074001-1-074001-3.

Office Action received for Chinese Patent Application No. 201610077750.8, dated Nov. 28, 2017, 11 pages (5 pages of English Translation and 6 pages of Office Action).

Cho et al., "Properties of Up Conversion Phosphors Necessary for Small Size Emissive Displays", Journal of Display Technology, vol. 7, No. 2, Feb. 2011, pp. 77-83.

* cited by examiner

DISPLAY DEVICE

RELATED APPLICATIONS

The present application is the U.S. national phase entry of PCT/CN2016/082499, with an international filling date of May 18, 2016, which claims the benefit of Chinese Patent Application NO. 201610077750.8, filed on Feb. 3, 2016, the entire disclosure of which is incorporated herein by reference.

FIELD OF THE INVENTION

The present disclosure relates to the field of display technology, particularly to a display device.

BACKGROUND

With the continuous development of the display technology, the liquid crystal display (LCD) and the organic light emitting diode (OLED) display device have been developed rapidly. However, the existing LCD and OLED display device both have their shortcomings, for example, the LCD will be limited due to large difficulty in the manufacturing process when being applied in the flexible display field. The OLED itself has the problems of low yield, high cost and short life time, etc.

Therefore, there is a need in the art to provide a new display device that can mitigate or alleviate the above mentioned problems.

SUMMARY

In view of this, embodiments of the present invention provide a new e display device.

The display device provided by embodiments of the present invention comprises a substrate, a plurality of pixels on the substrate, and a backlight module located at a side of the substrate away from the pixels. Each pixel may have a microcavity structure, in which the light emitted from the backlight module oscillates many times and exits therefrom as visible light of at least three colors.

In a possible embodiment, each pixel comprises at least three sub-pixels, each sub-pixel comprises two phase transition units stacked on the substrate and an upconversion unit between the two phase transition units. Colors of upconversion units of respective sub-pixels in each pixel are different from each other.

In a possible embodiment, the colors of the upconversion units of respective sub-pixels in each pixels are red, green and blue respectively.

In a possible embodiment, each phase transition unit comprises a lower electrode, a phase transition layer and an upper electrode stacked successively.

In a possible embodiment, the sub-pixels are arranged in a matrix. The display device further comprises a plurality of gate lines in one-to-one correspondence with the sub-pixels of each row and a plurality of data lines in one-to-one correspondence with the sub-pixels of each column. Each sub-pixel further comprises a thin film transistor, a gate of the thin film transistor is electrically connected with a gate line corresponding to a row where the sub-pixel locates, a source of the thin film transistor is electrically connected with a data line corresponding to a column where the sub-pixel locates, and a drain of the thin film transistor is electrically connected with the lower electrodes in the sub-pixel.

In a possible embodiment, each pixel comprises four phase transition units stacked on the substrate and an upconversion unit between every two adjacent phase transition units of the four phase transition units. Colors of respective upconversion units in each pixel are different from each other.

In a possible embodiment, the colors of respective upconversion units in each pixel are red, green and blue respectively.

In a possible embodiment, each phase transition unit comprises a lower electrode, a phase transition layer and an upper electrode stacked successively.

In a possible embodiment, the pixels are arranged in a matrix. The display device further comprises a plurality of gate lines in one-to-one correspondence with pixels of each row and a plurality of data lines in one-to-one correspondence with pixels of each column. Each pixel further comprises a thin film transistor, a gate of the thin film transistor is electrically connected with a gate line corresponding to a row where the pixel locates, a source of the thin film transistor is electrically connected with a data line corresponding to a column where the pixel locates, and a drain of the thin film transistor is electrically connected with respective lower electrodes in the pixel.

In a possible embodiment, a material of a red upconversion unit is chalcogenide doped with lanthanide ions or actinide ions.

In a possible embodiment, a material of a green upconversion unit is fluoride doped with lanthanide ions or actinide ions.

In a possible embodiment, a material of a blue upconversion unit is chloride doped with lanthanide ions or actinide ions.

In a possible embodiment, an orthographic projection of the lower electrode in each phase transition unit on the substrate at least partly overlaps with an orthographic projection of the upper electrode in the phase transition unit on the substrate. Alternatively, the lower electrode in each phase transition unit and the upper electrode in the phase transition unit are located on a body diagonal of the phase transition unit respectively, and the orthographic projection of the lower electrode in each phase transition unit on the substrate does not overlap with the orthographic projection of the upper electrode in the phase transition unit on the substrate.

In a possible embodiment, a material of the lower electrode is any one of a group comprising tin indium oxide, molybdenum, aurum, graphene and silver nanowire.

In a possible embodiment, a material of the phase transition layer is any one of a group comprising vanadium oxide, lanthanum oxide and manganate.

In a possible embodiment, a material of the upper electrode is any one of a group comprising tin indium oxide, molybdenum, aurum, graphene and silver nanowire.

In a possible embodiment, each lower electrode has a same thickness, each upper electrode has a same thickness, each phase transition layer has a same thickness, each upconversion unit has a same thickness. The light emitted from the backlight module has a single wavelength.

In a possible embodiment, the thicknesses of each upper electrode and each lower electrode both range from 50 nm to 150 nm, the thickness of each phase transition layer ranges from 100 nm to 200 nm, and the thickness of each upconversion units ranges from 120 nm to 180 nm. The wavelength of the light emitted from the backlight module ranges from 1500 nm to 1600 nm.

In a possible embodiment, each of the upper electrode and the lower electrode has a thickness of 100 nm, the phase transition layer has a thickness of 150 nm, and the upconversion unit has a thickness of 150 nm. The wavelength of the light emitted from the backlight module is 1550 nm.

In a possible embodiment, each lower electrode has a same thickness, each upper electrode has a same thickness, each phase transition layer has a same thickness, a thickness of a red upconversion unit, a thickness of a green upconversion unit and a thickness of a blue upconversion unit in each pixel are not equal to each other. The light emitted from the backlight module has a first wavelength, a second wavelength and a third wavelength.

In a possible embodiment, each of the upper electrode and the lower electrode has a thickness ranging from 50 nm to 150 nm, each phase transition layer has a thickness ranging from 100 nm to 200 nm, the red upconversion unit in each pixel has a thickness ranging from 80 nm to 120 nm, the green upconversion unit in each pixel has a thickness ranging from 130 nm to 170 nm, and the blue upconversion unit in each pixel has a thickness ranging from 180 nm to 220 nm. The first wavelength ranges from 1400 nm to 1490 nm, the second wavelength ranges from 1500 nm to 1590 nm, and the third wavelength ranges from 1600 nm to 1690 nm.

In a possible embodiment, each of the upper electrode and the lower electrode has a thickness of 100 nm, the phase transition layer has a thickness of 150 nm, the red upconversion unit in each pixel has a thickness of 100 nm, the green upconversion unit in each pixel has a thickness of 150 nm, and the blue upconversion unit in each pixel has a thickness of 200 nm. The first wavelength is 1450 nm, the second wavelength is 1550 nm, and the third wavelength is 1650 nm.

The display devices provided by the above embodiments of the invention comprise a substrate, a plurality of pixels on the substrate and a backlight module located at a side of the substrate away from the pixels. Each pixel has a microcavity structure, in which the light emitted from the backlight module oscillates many times and exits therefrom as visible light of at least three colors, thereby enabling the display device to realize color display. Compared to the existing liquid crystal display device, the display device according to embodiments of the invention will not be limited by the manufacturing process when it is applied in the flexible display field. Compared to the existing organic electroluminescent display device, the display device according to embodiments of the invention will not have the problems of low yield, high cost and short life time, etc.

DETAILED DESCRIPTION OF THE EMBODIMENTS

Figure 1:
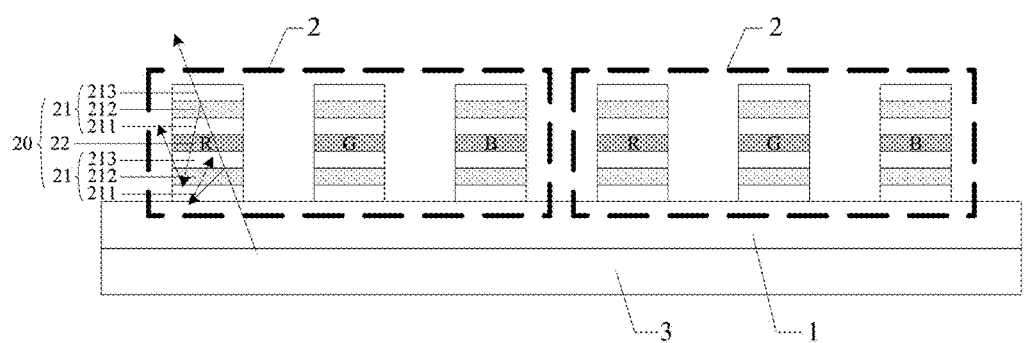
FIG. 1 is a structural schematic view of a display device provided by an embodiment of the invention.

Next, the specific implementation for the display device provided by embodiments of the invention will be explained in detail with reference to the drawings.

The shapes and thickness of respective layers in the drawings do not reflect the real proportions thereof, which only aim to illustrate the embodiments of the disclosure.

Figure 2:
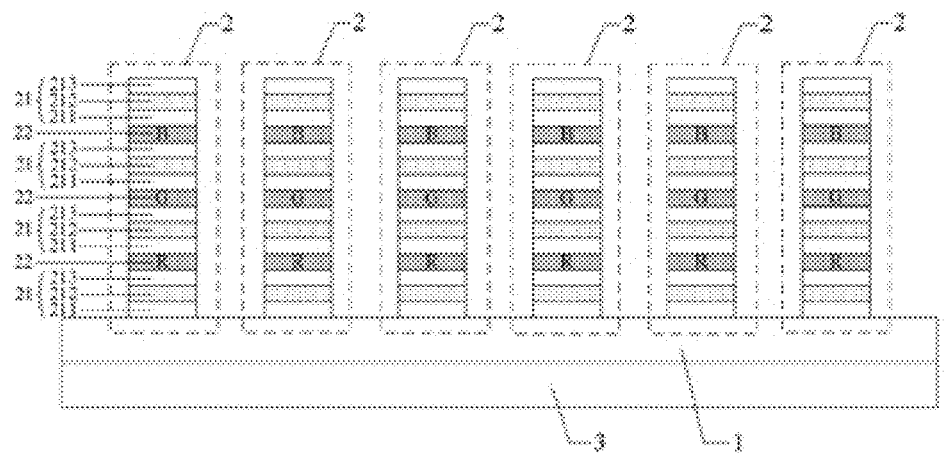
FIG. 2 is a structural schematic view of a display device provided by another embodiment of the invention.

As shown in FIG. 1 and FIG. 2, the display device may comprise a substrate 1, a plurality of pixels 2 on the substrate 1, and a backlight module 3 located at a side of the substrate 1 away from the pixels 2. Each pixel 2 has a microcavity structure, in which the light emitted from the backlight module 3 may oscillate many times and exit therefrom as visible light of at least three colors.

In the display device provided by the embodiment of the invention, since each pixel has a microcavity structure, the light emitted by the backlight module can oscillate many times in the microcavaty structure of each pixel and exit therefrom as visible light of at least three colors, the display device thus can realize color display. Compared to the existing liquid crystal display device, this display device will not be limited by the manufacturing process when it is applied in the flexible display field. Compared to the existing OLED display device, this display device will not suffer from the problem of low yield, high cost and short life time, etc.

In an embodiment, as shown in FIG. 1, each pixel 2 can comprise at least three sub-pixels 20 (in FIG. 1, for example, each pixel 2 comprises three sub-pixels 20). Each sub-pixel 20 may comprise two phase transition units 21 and an upconversion unit 22 between the two phase transition units 21, which are stacked on the substrate 1. Colors of the upconversion units 22 of respective sub-pixels 20 in each pixel 2 are different from each other. Specifically, as shown in FIG. 1, the two stacked phase transition units 21 and the upconversion unit 22 between the two phase transition units constitute a microcavity structure. The light emitted by the backlight module 3 may oscillate repeatedly in the microcavity structure and exit therefrom as visible light with the color of the upconversion unit 22 in the microcavity structure. In this embodiment, each pixel 2 comprises three parallel microcavity structures. The colors of the upconversion units 22 in the three microcavity structures comprised by each pixel 2 are different from each other. The light emitted by the backlight module 3 can oscillate repeatedly in the three microcavity structures of each pixel 2 and exit therefrom as visible light of three colors, thereby enabling the display device to realize color display.

In an embodiment, as shown in FIG. 1, the colors of the upconversion units 22 of respective sub-pixels 20 in each pixel 2 can be red (R), green (G) and blue (B) respectively. For example, the light emitted by the backlight module 3 may oscillate repeatedly in the microcavity structure with the red upconversion unit and exit therefrom as visible light of red (R). The light emitted by the backlight module 3 may oscillate repeatedly in the microcavity structure with the green upconversion unit and exit therefrom as visible light of green (G). The light emitted by the backlight module 3 may oscillate repeatedly in the microcavity structure with the blue upconversion unit and exit therefrom as visible light of blue (B). In this way, the display device can achieve color display.

Certainly, each pixel may comprise four sub-pixels. For example, the colors of the upconversion units of respective sub-pixels in each pixel may be red (R), green (G), blue (B) and yellow (Y) respectively. Alternatively, each pixel may comprise much more sub-pixels, which will not be limited herein.

In an embodiment, as shown in FIG. 1, each phase transition unit 21 may comprise a lower electrode 211, a phase transition layer 212 and an upper electrode 213 stacked successively. Specifically, by applying a voltage to the lower electrode 211 and the upper electrode 213 in each phase transition unit 21 respectively to generate a voltage difference between the lower electrode 211 and the upper electrode 213, the refractive index and the dielectric constant of the phase transition layer 212 between the lower electrode 211 and the upper electrode 213 can be changed. The phase transition unit 21 located at a side of the upconversion unit 22 facing towards the backlight module 3 may be designed to perform partial transmission and partial reflection for the light emitted from the backlight module 3 and perform total reflection, total transmission or partial transmission to the visible light, and the phase transition unit 21 located at a side of the upconversion unit 22 away from the backlight module 3 may be designed to perform total reflection for the light emitted from the backlight module 3 and total transmission to the visible light, so that the light emitted from the backlight module 3 can oscillate repeatedly in a microcavity structure formed by two stacked phase transition units 21 and the upconversion unit 22 between the two phase transition units, and exit therefrom as visible light with the color of the upconversion unit in the microcavity structure.

Figure 3:
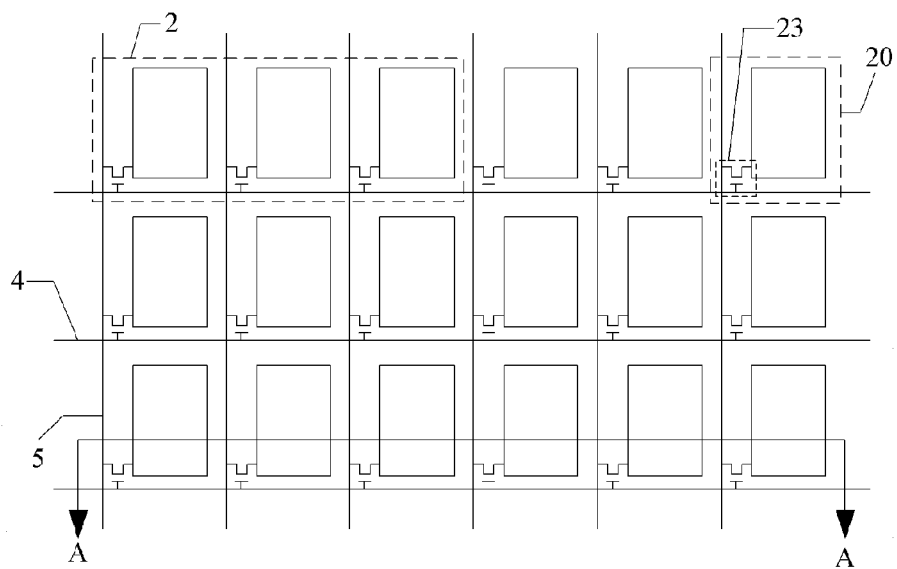
FIG. 3 is a schematic circuit diagram for the display device as shown in FIG. 1.

In an embodiment, as shown in FIG. 3 (the sectional view of FIG. 3 along the AA direction is namely FIG. 1), the sub-pixels 20 can be arranged in a matrix. The display device may further comprise a plurality of gate lines 4 in one-to-one correspondence with sub-pixels 20 of each row and a plurality of data lines 5 in one-to-one correspondence with sub-pixels 20 of each column. Each sub-pixel 20 may further comprise a thin film transistor 23. The gate of the thin film transistor 23 for each sub-pixel 20 is electrically connected with a gate line 4 corresponding to the row where the sub-pixel locates. The source of the thin film transistor 23 is electrically connected with a data line 5 corresponding to the column where the sub-pixel locates. The drain of the thin film transistor 23 is electrically connected with the lower electrode (not shown in FIG. 3) in the sub-pixel. Specifically, the lower electrode in each sub-pixel may be electrically connected to the drain of the thin film transistor in the sub-pixel through a via hole. Specifically, within a time period for one frame, a gate scanning signal may be applied to respective gate lines 4 in sequence so as to turn on the thin film transistors 23 row by row. A gray scale signal may be applied to respective data lines 5. The gray scale signal may be loaded to the lower electrode 211 through the thin film transistor 23 that has been turned on. A fixed voltage may be applied to respective upper electrodes 213, a voltage difference thus can be generated between the upper electrode 213 and the lower electrode 211 in each phase transition unit 21, so it is possible to change the refractive index and the dielectric constant of the phase transition layer 212 in each phase transition unit 21. Hence, the phase transition unit 21 located at a side of the upconversion unit 22 facing towards the backlight module 3 may be enabled to perform partial transmission and partial reflection for the light emitted from the backlight module 3 and perform total reflection, total transmission or partial transmission to the visible light, and the phase transition unit 21 located at a side of the upconversion unit 22 away from the backlight module 3 may be enabled to perform total reflection for the light emitted from the backlight module 3 and total transmission to the visible light, such that the light emitted from the backlight module 3 can oscillate repeatedly in a microcavity structure formed by two stacked phase transition units 21 and the upconversion unit 22 between the two phase transition units, and exit therefrom as visible light with the color of the upconversion unit in the microcavity structure. The corresponding voltages applied can be determined based on wave optics. For example, an identical optical characteristic, such as an identical light intensity, color, can be realized every certain period.

In some embodiments, applying a fixed voltage to respective upper electrodes can be realized by electrically connecting the upper electrodes to the ground, i.e., applying a zero voltage signal to the respective upper electrodes. Alternatively, two thin film transistors may be comprised in each sub-pixel. The upper electrode in each sub-pixel may be electrically connected with the drain of one thin film transistor in the sub-pixel through a via hole, and a fixed voltage signal can be applied to the upper electrode in the sub-pixel through this thin film transistor. The lower electrode in each sub-pixel may be electrically connected with the drain of the other thin film transistor in the sub-pixel through a via hole, and a gray scale signal may be applied to the lower electrode in the sub-pixel through said other thin film transistor. The possible implementations for applying a fixed voltage to respective upper electrodes are not limited to these. In other embodiments, the upper electrodes in the phase transition units of the same layer may be designed as integral planar electrode. In this case, a fixed voltage signal may be applied to the integral planar electrode through a lead wire. A gray scale signal can be loaded to respective lower electrodes in the sub-pixel by means of the thin film transistor in each sub-pixel so as to enable the display device to realize gray scale display.

Certainly, the lower electrodes in two phase transition units in each sub-pixel may be electrically connected, in this case, only the lower electrode in one phase transition unit in each sub-pixel is electrically connected to a drain of the thin film transistor in this sub-pixel, which will not be described in detail here. Alternatively, two thin film transistors may be arranged in each sub-pixel. The drains of the two thin film transistors are electrically connected with the lower electrodes in two phase transition units in this sub-pixel respectively. A voltage difference may be generated between the upper electrode and the lower electrode in each phase transition unit by applying different voltage signals to the lower electrodes in the two phase transition units through the two thin film transistors respectively and applying a fixed voltage signal to the respective upper electrodes, which will not be described in detail here. Alternatively, the drain of the thin film transistor in each sub-pixel may be electrically connected with the upper electrodes in the sub-pixel respectively. Then a voltage difference may be generated between the upper electrode and the lower electrode in each phase transition unit by applying a fixed voltage signal to respective lower electrodes, which will not be described in detail herein.

According to another embodiment of the invention, as shown in FIG. 2, each pixel 2 comprises four phase transition units 21 stacked on the substrate 1 and upconversion units 22 between every two adjacent phase transition units of the four phase transition units. Colors of respective upconversion units 22 in each pixel 2 are different from each other. Specifically, as shown in FIG. 2, every two adjacent phase transition units in the four stacked phase transition units 21 and the upconversion unit 22 between the two phase transition units may constitute a microcavity structure. The light emitted from the backlight module 3 may oscillate repeatedly in each microcavity structure and exit therefrom as visible light of the corresponding color of the upconversion unit 22 in the microcavity structure. For example, each pixel 2 may comprise three microcavity structures stacked vertically, and the colors of the upconversion units 22 in the three microcavity structures of each pixel 2 are different from each other. The light emitted by the backlight module 3 may oscillate repeatedly in the three microcavity structures of each pixel 2 and exit therefrom as visible light with three colors, so as to enable the display device to realize color display. For the display device as shown in FIG. 2, it can be achieved as a field sequential display. For example, at the same pixel position, different colors and gray scales may be displayed at different times according to the time frequency, and color mixing effect for display can be achieved by fast switching in frequency.

In an embodiment, as shown in FIG. 2, the colors of respective upconversion units 22 in each pixel 2 can be red (R), green (G) and blue (B) respectively. For example, the light emitted by the backlight module 3 may oscillate repeatedly in the microcavity structure with the red upconversion unit and exit therefrom as visible light of red (R). The light emitted by the backlight module 3 may oscillate repeatedly in the microcavity structure with the green upconversion unit and exit therefrom as visible light of green (G). The light emitted by the backlight module 3 may oscillate repeatedly in the microcavity structure with the blue upconversion unit and exit therefrom as visible light of blue (B). In this way, the display device can realize color display.

Certainly, each pixel may comprise five stacked phase transition units and upconversion units between every two adjacent phase transition units of the five phase transition units. That is to say, each pixel comprises four microcavity structures stacked vertically. The colors of the upconversion units in the four microcavity structures of each pixel for example can be red (R), green (G), blue (B) and yellow (Y) respectively, which will not limit the possible colors for the upconversion units. Alternatively, each pixel may comprise much more microcavity structures stacked vertically, which will not be limited to the embodiments discussed herein.

In an embodiment, as shown in FIG. 2, each phase transition unit 21 comprises a lower electrode 211, a phase transition layer 212 and an upper electrode 213 stacked successively. Specifically, by applying a voltage to the lower electrode 211 and the upper electrode 213 in each phase transition unit 21 respectively to generate a voltage difference between the lower electrode 211 and the upper electrode 213, the refractive index and the dielectric constant of the phase transition layer 212 between the lower electrode 211 and the upper electrode 213 can be changed. The phase transition unit 21 located at a side of the upconversion unit 22 facing towards the backlight module 3 in each microcavity structure may be designed to perform partial transmission and partial reflection for the light emitted from the backlight module 3 and perform total transmission to the visible light, and the phase transition unit 21 located at a side of the upconversion unit 22 away from the backlight module 3 in each microcavity structure may be designed to perform total reflection for the light emitted from the backlight module 3 and total transmission to the visible light, so that the light emitted from the backlight module 3 can oscillate repeatedly in each microcavity structure and exit therefrom as visible light with the color of the upconversion unit in the microcavity structure.

Figure 4:
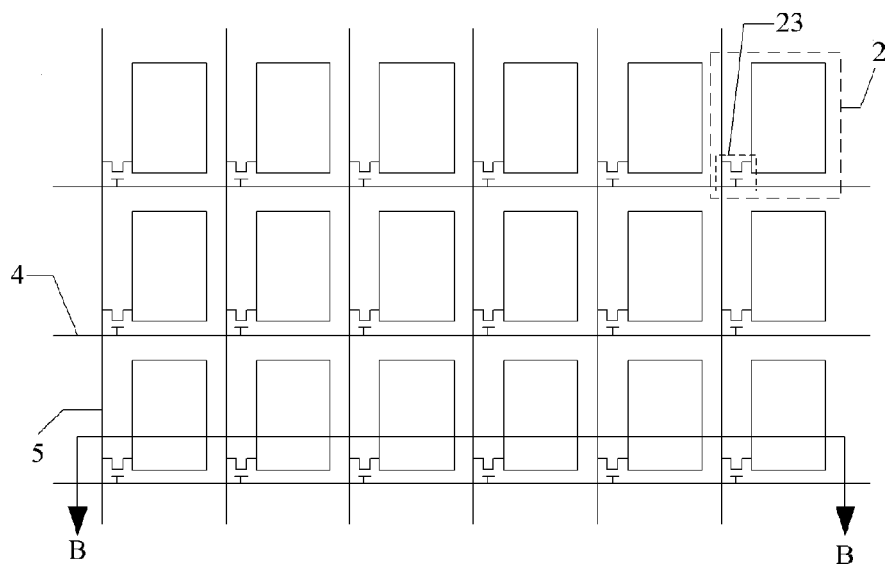
FIG. 4 is a schematic circuit diagram for the display device as shown in FIG. 2.

In an embodiment, as shown in FIG. 4 (the sectional view of FIG. 4 along the BB direction is namely FIG. 2), the pixels 2 are arranged in a matrix. The display device may further comprise a plurality of gate lines 4 in one-to-one correspondence with pixels 2 in the row direction and a plurality of data lines 5 in one-to-one correspondence with pixels 2 in the column direction. Each pixel 2 can further comprise a thin film transistor 23. The gate of the thin film transistor 23 of each pixel 2 is electrically connected with a gate line 4 corresponding to the row where the pixel locates. The source of the thin film transistor 23 is electrically connected with a data line 5 corresponding to the column where the pixel locates. The drain of the thin film transistor 23 is electrically connected with the lower electrodes (not shown in FIG. 4) in the pixel. Specifically, the respective lower electrodes in each pixel can be electrically connected with the drain of the thin film transistor in the pixel through via holes. Specifically, within a display time period for one frame, a gate scanning signal may be applied to respective gate lines 4 in sequence so as to turn on the thin film transistors 23 row by row. A gray scale signal may be applied to respective data lines 5. The gray scale signal may be loaded to the lower electrode 211 through the thin film transistor 23 that has been turned on. A fixed voltage may be applied to respective upper electrodes 213, a voltage difference thus can be generated between the upper electrode 213 and the lower electrode 211 in each phase transition unit 21, so it is possible to change the refractive index and the dielectric constant of the phase transition layer 212 in each phase transition unit 21. Hence, the phase transition unit 21 located at a side of the upconversion unit 22 facing towards the backlight module 3 in each microcavity structure may be enabled to perform partial transmission and partial reflection for the light emitted from the backlight module 3 and perform total transmission to the visible light, and the phase transition unit 21 located at a side of the upconversion unit 22 away from the backlight module 3 may be enabled to perform total reflection for the light emitted from the backlight module 3 and total transmission to the visible light, such that the light emitted from the backlight module 3 can oscillate repeatedly in each microcavity structure and exit therefrom as visible light with the color of the upconversion unit in the microcavity structure. In the display device as shown in FIG. 4, corresponding voltage signals can be provided to the units stacked together at different times via a same thin film transistor through high frequency operation, so as to realize field sequential display.

In some embodiments, applying a fixed voltage signal to respective upper electrodes can be realized by electrically connecting the respective upper electrodes to the ground, i.e., applying a zero voltage signal to the respective upper electrodes. Alternatively, two thin film transistors may be arranged in each pixel. The respective upper electrodes in each pixel are electrically connected with the drain of one thin film transistor in the pixel through via holes, and a fixed voltage signal is applied to the respective upper electrodes in the pixel through this thin film transistor. The respective lower electrodes in each pixel are electrically connected with the drain of the other thin film transistor in the pixel through via holes, and a gray scale signal is applied to the respective lower electrodes in the pixel through the other thin film transistor. The embodiments of the invention are not limited to these. In other embodiments, the upper electrodes in the phase transition units of the same layer may be designed as integral planar electrode. In this case, a fixed voltage signal may be applied to the integral planar electrode through a lead wire. A gray scale signal can be loaded to respective lower electrodes in the pixel by means of the thin film transistor in each pixel so as to enable the display device to realize gray scale display.

In an embodiment, the lower electrodes in respective phase transition units in each pixel can be electrically connected, in this case, it is only required that the lower electrode in one phase transition unit in each pixel is electrically connected with a drain of the thin film transistor in this pixel, which will not be described in detail here. Alternatively, multiple transistors in one-to-one correspondence with the phase transition units can be arranged in each pixel. For example, in case four phase transition units are comprised in each pixel, four thin film transistors can be arranged in each pixel. The drains of the four thin film transistors are electrically connected with the lower electrodes in the four phase transition units in this pixel respectively. A voltage difference may be generated between the upper electrode and the lower electrode in each phase transition unit by applying different voltage signals to the lower electrodes in the four phase transition units through the four thin film transistors respectively and applying a fixed voltage signal to the respective upper electrodes, which will not be discussed in detail here. Alternatively, the drains of the thin film transistors in each pixel can be electrically connected with respective upper electrodes in the pixel respectively. A voltage difference is generated between the upper electrode and the lower electrode in each phase transition unit by applying a fixed voltage signal to the lower electrodes, which will not be discussed in detail here.

To sum up, in the above embodiments, the microcavity structures in each pixel may be tiled in parallel as shown in FIG. 1, alternatively, the microcavity structures in each pixel may also be stacked vertically as shown in FIG. 2. However, it should be noted that compared to the display device in which the microcavity structures in each pixel are tiled in parallel, the display device in which the microcavity structures in each pixel are stacked vertically may have a higher resolution.

In some embodiments, the thin film transistor can be oxide thin film transistors or low temperature polycrystalline silicon thin film transistors and so on, which will not be discussed in detail here. Specifically, the material of the gate of the thin film transistor can be metal, for example molybdenum (Mo). The thickness thereof may be around 200 nm. It can be fabricated through sputtering. The material of the active layer may comprise a transparent electrically conductive oxide such as indium gallium zinc oxide (IGZO). The thickness thereof can be around 50 nm. It can be fabricated through sputtering. The oxygen content of the gas atmosphere in the process of sputtering can be controlled between 10% and 80%. The material of the gate insulating layer located between the gate and the active layer may comprise silicon oxide ($SiO_2$). Its thickness can be around 150 nm. It can be fabricated through chemical vapor deposition (CVD). The deposition temperature may be controlled at 370° C. The materials for the source and the drain may be laminated metals, for example, molybdenum/aluminum (Mo/Al). The thickness thereof may be around 200 nm, and they can be fabricated through sputtering. According to an embodiment of the invention, in order to enhance the adhesion between the thin film transistor and the substrate, a buffer layer can be arranged between the substrate and the thin film transistor. The material of the buffer layer may comprise silicon oxide or silicon nitride, etc. Its thickness may be around 200 nm. It can be formed through chemical vapor deposition (CVD).

In some embodiments, a pixel definition layer can also be arranged for the display device. In this case, the components such as gate lines, data lines and the thin film transistors may be arranged in an area where the pixel definition layer locates, so as to avoid the problem of light leakage for the display device.

In some embodiments, the material of the red upconversion unit can be chalcogenide doped with lanthanide ions or actinide ions. For example, the material of the red upconversion unit can be any one of $Ca_2S_3:La_2O_3:Er^{3+}$, CaS:Eu and CaS:Sm. The red upconversion unit can be formed through spin coating, photoetching and etching, which will not be discussed in detail here.

In some embodiments, the material of the green upconversion unit can be fluoride doped with lanthanide ions or actinide ions, for example, $BaY_2F_8:Tm^{3+}$. The green upconversion unit can be formed through spin coating, photoetching, etching.

In some embodiments, the material of the blue upconversion unit can be chloride doped with lanthanide ions or actinide ions, for example, $K_2ZnCl_4:Nd^{3+}$. The blue upconversion unit can be formed through spin coating, photoetching, etching successively.

In some embodiments, as shown in FIG. 1 and FIG. 2, an orthographic projection of the lower electrode 211 in each phase transition unit 21 on the substrate 1 may completely overlap with an orthographic projection of the upper electrode 213 in the phase transition unit on the substrate 1. In other embodiment, the orthographic projection of the lower electrode in each phase transition unit on the substrate may partially overlap with the the orthographic projection of the upper electrode in the phase transition unit on the substrate. Alternatively, the relation between the lower electrode in each phase transition unit and the upper electrode in the phase transition unit may be in diagonal fashion. That is, the lower electrode in each phase transition unit and the upper electrode in the phase transition unit may be located on a body diagonal of the phase transition unit respectively, and the orthographic projection of the lower electrode in each phase transition unit on the substrate does not overlap with the orthographic projection of the upper electrode in the phase transition unit on the substrate. The arrangement for the lower electrode and the upper electrode in the phase transition unit is not limited to these.

In some embodiments, in each phase transition unit, the material of the lower electrode can be any one of the group comprising tin indium oxide (ITO), molybdenum (Mo), aurum (Au), graphene and silver nanowire, which will not be discussed in detail here.

In some embodiments, in each phase transition unit, the material of the phase transition layer can be any one of the group comprising vanadium oxide (VOx), lanthanum oxide and manganate, which will not limit the embodiments of the invention.

In some embodiments, in each phase transition unit, the material of the upper electrode can be any one of the group comprising tin indium oxide (ITO), molybdenum (Mo), aurum (Au), graphene and silver nanowire, which will not limit the embodiments of the invention.

In some embodiments, no matter the microcavity structures in each pixel are tiled in parallel as shown in FIG. 1 or are stacked vertically as shown in FIG. 2, the thickness of respective lower electrodes and the thickness of respective upper electrodes may be equal, the thickness of respective phase transition layers may be equal, and the thickness of respective upconversion units may be equal. That is to say, the respective microcavity structures may have a same cavity length. With such a microcavity structure, a light source with a single wavelength can be selected as the light source of the backlight module.

In some embodiments, the thickness of respective upper electrodes and respective lower electrodes can be in a range from 50 nm to 150 nm, the thickness of respective phase transition layers can be in a range from 100 nm to 200 nm, and the thickness of respective upconversion units can be in a range from 120 nm to 180 nm. With such a microcavity structure, a light source with a wavelength in a range from 1500 nm to 1600 nm can be selected as the light source of the backlight module.

According to another embodiment, the light source with a wavelength of 1550 nm can be selected as the light source of the backlight module, since the human eyes are relatively sensitive to green, and the maximum absorption peak of the green upconversion unit is at 1550 nm. With respect to such an infrared wavelength, in order to enable the phase transition unit located at a side of the upconversion unit away from the backlight module in each microcavity structure to perform total reflection for the light emitted from the backlight module and total transmission to the visible light, and enable the phase transition unit located at a side of the upconversion unit facing towards the backlight module in each microcavity structure to perform partial reflection and partial transmission for the light emitted by the backlight module and total transmission to visible light, each of the upper electrode and lower electrode may have a thickness of 100 nm, each phase transition layer may have a thickness of 150 nm, and each upconversion unit may have a thickness of 150 nm.

In some embodiments, no matter the microcavity structures in each pixel are tiled in parallel as shown in FIG. 1 or are stacked vertically as shown in FIG. 2, the thickness of respective lower electrodes and the thickness of respective upper electrodes may be equal, the thickness of respective phase transition layer may be equal, while the red upconversion unit, the green upconversion unit and the blue upconversion unit in each pixel have different thicknesses. That is to say, in this case, the cavity lengths of the three microcavity structures (which can be tiled in parallel or stacked vertically) of each pixel are not equal to each other. With respect to such microcavity structures, a light source having a first wavelength, a second wavelength and a third wavelength can be selected as the light source of the backlight module.

In some embodiments, the thicknesses of respective upper electrodes and respective lower electrodes can be in a range from 50 nm to 150 nm, the thickness of respective phase transition layers can be in a range from 100 nm to 200 nm, the thickness of the red upconversion unit in each pixel can be in a range from 80 nm to 120 nm, the thickness of the green upconversion unit in each pixel can be in a range from 130 nm to 170 nm, and the thickness of the blue upconversion unit in each pixel can be in a range from 180 nm to 220 nm. With such microcavity structures, a light source having a first wavelength in a range from 1400 nm to 1490 nm, a second wavelength in a range from 1500 nm to 1590 nm, and a third wavelength in a range from 1600 nm to 1690 nm may be used as the light source of the backlight module.

In some embodiments, because the maximum absorption peaks for the red upconversion unit, the green upconversion unit and the blue upconversion unit are 1650 nm, 1550 nm and 1450 nm respectively, a light source having a first wavelength of 1450 nm, a second wavelength of 1550 nm and a third wavelength of 1650 nm can be selected as the light source of the backlight module. With respect to the three infrared wavelengths, in order to enable the phase transition unit located at a side of the upconversion unit away from the backlight module in each microcavity structure to perform total reflection to the light emitted by the backlight module and total transmission to the visible light, and enable the phase transition unit located at a side of the upconversion unit facing towards the backlight module in each microcavity structure to perform partial reflection and partial transmission to the light emitted by the backlight module and total transmission to the visible light, each of the upper electrode and lower electrode may have a thickness of 100 nm, the respective phase transition layers may have a thickness of 150 nm, the red upconversion unit in each pixel may have a thickness of 100 nm, the green upconversion unit in each pixel may have a thickness of 150 nm, and the blue upconversion unit in each pixel may have a thickness of 200 nm. It should be noted that, the backlight module need to perform scanning for light of the three wavelengths successively according to the time sequence. Within the time period for applying a gate scanning signal to each gate line, the backlight module at least perform scanning for the light of the three wavelengths once, so as to enable each pixel to display red (R), green (G) and blue (B) successively within the time of one frame, thereby enabling the display device to realize color display.

In some embodiments, in order to protect the pixels from being damaged, a passivation layer (the material of the passivation layer may comprise silicon oxide or silicon nitride etc.) and a protective layer (the material of the protective layer may comprise an acrylic material) can be arranged above the pixels, and packaging can be performed using a thin film or using a cover plate above the protective layer. Moreover, in order to optimize the display effect of the display device, polarizers may be arranged between the backlight module and the substrate and at a side of the packaged film (or the packaged cover plate) away from the substrate. It should be noted that the backlight module may be of side light type. The display device can realize transparent display, i.e., light can exit from either the backlight module and the packaged film (or the packaged cover plate). If a reflective film is arranged at a side of the backlight module away from the substrate, the display device may achieve top light emission. If a reflective film is arranged at a side of the packaged film (or the packaged cover plate) away from the substrate, the display device may realize bottom light emission.

It should be noted that the display device provided by embodiments of the invention can be any product or component with the displaying function such as a mobile phone, a panel computer, a television, a display, a laptop, a digital photoframe, a navigator etc., which will not be limited to the examples described herein. Moreover, the display device provided by embodiments of the invention is particularly applicable for a flexible display device.

The display device provided by the embodiments of the invention comprises a substrate, a plurality of pixels located on the substrate and a backlight module located at a side of the substrate away from the pixels. Because each pixel has a microcavity structure, the light emitted by the backlight module may oscillate many times in the microcavity structure of each pixel and exit therefrom as visible light of at least three colors, thereby enabling the display device to realize color display. Compared to the existing liquid crystal display device, the display device according to embodiments of the invention will not be limited by the manufacturing process when it is applied in the flexible display field. Compared to the existing OLED display device, the display device according to the embodiment of the invention will not suffer from the problems of low yield, high cost and short life time, etc.

Apparently, the skilled person in the art can make various amendments and modifications to the embodiments of the invention without departing from the spirit and the scope of the present invention. In this way, provided that these amendments and modifications of the embodiments fall

The invention claimed is:

1. A display device, comprising:
   a substrate;
   a plurality of pixels on the substrate; and
   a backlight module located at a side of the substrate away from the pixels,
   wherein each pixel has a microcavity structure, in which a light emitted from the backlight module oscillates many times and from which the light exits as visible light of at least three colors.

2. The display device as claimed in claim 1, wherein each pixel comprises at least three sub-pixels, wherein each sub-pixel comprises two phase transition units stacked on the substrate and an upconversion unit between the two phase transition units, and
   wherein colors of upconversion units of respective sub-pixels in each pixel are different from each other.

3. The display device as claimed in claim 2, wherein the colors of the upconversion units of respective sub-pixels in each pixels are red, green and blue respectively.

4. The display device as claimed in claim 3, wherein a material of a red upconversion unit is chalcogenide doped with lanthanide ions or actinide ions.

5. The display device as claimed in claim 3, wherein a material of a green upconversion unit is fluoride doped with lanthanide ions or actinide ions.

6. The display device as claimed in claim 3, wherein a material of a blue upconversion unit is chloride doped with lanthanide ions or actinide ions.

7. The display device as claimed in claim 2, wherein each phase transition unit comprises a lower electrode, a phase transition layer and an upper electrode stacked successively.

8. The display device as claimed in claim 7, wherein the sub-pixels are arranged in a matrix,
   wherein the display device further comprises a plurality of gate lines in one-to-one correspondence with the sub-pixels of each row and a plurality of data lines in one-to-one correspondence with the sub-pixels of each column,
   wherein each sub-pixel further comprises a thin film transistor, a gate of the thin film transistor is electrically connected with a gate line corresponding to a row where the sub-pixel locates, a source of the thin film transistor is electrically connected with a data line corresponding to a column where the sub-pixel locates, and wherein a drain of the thin film transistor is electrically connected with the lower electrodes in the sub-pixel.

9. The display device as claimed in claim 7, wherein an orthographic projection of the lower electrode in each phase transition unit on the substrate at least partly overlaps with an orthographic projection of the upper electrode in the phase transition unit on the substrate; or,
   the lower electrode in each phase transition unit and the upper electrode in the phase transition unit are located on a body diagonal of the phase transition unit respectively, and the orthographic projection of the lower electrode in each phase transition unit on the substrate does not overlap with the orthographic projection of the upper electrode in the phase transition unit on the substrate.

10. The display device as claimed in claim 7, wherein a material of the lower electrode is any one of a group comprising tin indium oxide, molybdenum, aurum, graphene and silver nanowire.

11. The display device as claimed in claim 7, wherein a material of the phase transition layer is any one of a group comprising vanadium oxide, lanthanum oxide and manganate.

12. The display device as claimed in claim 7, wherein a material of the upper electrode is any one of a group comprising tin indium oxide, molybdenum, aurum, graphene and silver nanowire.

13. The display device as claimed in claim 7, wherein each lower electrode has a same thickness, each upper electrode has a same thickness, each phase transition layer has a same thickness, each upconversion unit has a same thickness,
    wherein the light emitted from the backlight module has a single wavelength.

14. The display device as claimed in claim 13, wherein the thicknesses of each upper electrode and each lower electrode range from 50 nm to 150 nm, the thickness of each phase transition layer ranges from 100 nm to 200 nm, and the thickness of each upconversion unit ranges from 120 nm to 180 nm;
    wherein the wavelength of the light emitted from the backlight module ranges from 1500 nm to 1600 nm.

15. The display device as claimed in claim 7, wherein: each lower electrode has a same thickness, each upper electrode has a same thickness, each phase transition layer has a same thickness; a thickness of a red upconversion unit, a thickness of a green upconversion unit and a thickness of a blue upconversion unit in each pixel are not equal to each other,
    and the light emitted from the backlight module has a first wavelength, a second wavelength and a third wavelength.

16. The display device as claimed in claim 15, wherein: each of the upper electrode and the lower electrode has a thickness ranging from 50 nm to 150 nm, each phase transition layer has a thickness ranging from 100 nm to 200 nm, the red upconversion unit in each pixel has a thickness ranging from 80 nm to 120 nm, the green upconversion unit in each pixel has a thickness ranging from 130 nm to 170 nm, the blue upconversion unit in each pixel has a thickness ranging from 180 nm to 220 nm,
    and the first wavelength ranges from 1400 nm to 1490 nm, the second wavelength ranges from 1500 nm to 1590 nm, and the third wavelength ranges from 1600 nm to 1690 nm.

17. The display device as claimed in claim 1, wherein each pixel comprises four phase transition units stacked on the substrate and an upconversion units between every two adjacent phase transition units of the four phase transition units,
    wherein colors of respective upconversion units in each pixel are different from each other.

18. The display device as claimed in claim 17, wherein the colors of respective upconversion units in each pixel are red, green and blue respectively.

19. The display device as claimed in claim 17, wherein each phase transition unit comprises a lower electrode, a phase transition layer and an upper electrode stacked successively.

20. The display device as claimed in claim 19, wherein the pixels are arranged in a matrix, wherein the display device further comprises a plurality of gate lines in one-to-one correspondence with pixels of each row and a plurality of data lines in one-to-one correspondence with pixels of each column, wherein each pixel further comprises a thin film transistor, a gate of the thin film transistor is electrically connected with a gate line corresponding to a row where the pixel locates, a source of the thin film transistor is electrically connected with a data line corresponding to a column where the pixel locates, and wherein a drain of the thin film transistor is electrically connected with respective lower electrodes in the pixel.

* * * * *